United States Patent
Decker

(10) Patent No.: US 6,463,617 B1
(45) Date of Patent: Oct. 15, 2002

(54) VEHICLE-WASHING SYSTEM FOR WASHING OF VEHICLES

(75) Inventor: Wolfgang Decker, Zusmarshausen-Wollbach (DE)

(73) Assignee: WashTec Holding GmbH, Augsburg (DE)

( * ) Notice: Subject to any disclaimer, the term of this patent is extended or adjusted under 35 U.S.C. 154(b) by 0 days.

(21) Appl. No.: 09/523,207

(22) Filed: Mar. 10, 2000

(30) Foreign Application Priority Data

Mar. 11, 1999 (DE) .......................................... 199 10 790

(51) Int. Cl.[7] .................................................. B60S 3/06
(52) U.S. Cl. ...................... 15/53.3; 15/53.2; 15/DIG. 2; 134/123
(58) Field of Search ................................ 15/53.1–53.3, 15/DIG. 2; 134/123

(56) References Cited

U.S. PATENT DOCUMENTS 5,452,859 A  9/1995  Flaxman ...................... 239/751

FOREIGN PATENT DOCUMENTS

DE  31 08 248  9/1982

*Primary Examiner*—Mark Spisich
(74) *Attorney, Agent, or Firm*—Flynn, Thiel, Boutell & Tanis, P.C.

(57) ABSTRACT

A vehicle-washing system for vehicles has high-pressure lateral spray devices with spray nozzles stationary in their height, which high-pressure lateral spray devices are arranged on both sides of a vehicle-washing position. An elevationally adjustable carrier is furthermore provided, on which carrier is arranged in particular a horizontal washing brush for cleaning the roof of a vehicle. With each lateral spray device is associated a further spray nozzle, which is connected to the first-mentioned spray nozzles through a flexible fluid pipeline. The further spray nozzles are provided on the carrier and are adjustable in their height following the upper contour of the vehicle to be washed. The vehicle-washing system of the invention achieves with few structural requirements a good cleaning result in the upper area of the sides of a vehicle, also for higher vehicles or for passenger vehicles with a sharply pulled-in area of the edge of the roof.

14 Claims, 5 Drawing Sheets

VEHICLE-WASHING SYSTEM FOR WASHING OF VEHICLES

FIELD OF THE INVENTION

The invention relates to a vehicle-washing system for washing of vehicles, in particular a portal vehicle-washing system, comprising high-pressure lateral spray devices arranged on both sides of a vehicle-washing position and each having spray nozzles for cleaning of the sides of the vehicle, whereby the spray nozzles cover with their spray angles an area up to a preadjusted height corresponding to the height of a passenger vehicle, and comprising a carrier elevationally adjustable in relation to the contour of the vehicle, on which carrier is arranged in particular a washing brush for cleaning the roof of the vehicle.

BACKGROUND OF THE INVENTION

Such a vehicle wash is known to the inventor as the state of the art. Lateral high-pressure pipes extend in such a vehicle wash along lateral columns of a portal-like frame on both sides of the vehicle-washing position. Each high-pressure pipe is equipped with a plurality of spray nozzles arranged in such a manner that the uppermost spray nozzle covers with its spray angle the edge of the roof of a passenger vehicle.

With this arrangement of the spray nozzles, the spraying into an unoccupied space is avoided, in particular, into the surrounding area of the vehicle-washing system, so that parts of the vehicle-washing apparatus become unnecessarily wet. The latter is undesired in particular in portal vehicle-washing systems since the unnecessary wetness of parts of the vehicle wash results in an unwelcome dripping during a drying process following the washing operation.

Minivans and off-road vehicles have lately become more and more popular. These vehicles are higher than the usual passenger vehicles. When these vehicles or even higher small busses or transporters are washed with the conventional vehicle washes, then a high-pressure prewash in the upper area of the vehicle, namely in an area which is higher than the normal height of a passenger vehicle, is not sufficient.

It has therefore already been suggested to use an additional lateral nozzle pipe in order to improve the prewash in the upper area of the vehicle, which nozzle pipe is added when a taller vehicle is sensorically recognized. In order to control this additional lateral nozzle pipe, high-pressure valves are used which enable a controlled fluid supply to the nozzle pipes. Such high-pressure valves are expensive and are susceptible to breakdown because of dirt particles contained in reconditioned washing water. Further, the control devices needed for this are technically complicated. Since for reasons of expense only, one high-pressure pump is supposed to be used, the nozzles of the high-pressure pipes can furthermore not be optimally positioned in the conventional vehicle wash. Thus, to wash common passenger vehicles, merely one nozzle pipe is used per side of a vehicle, whereas the pumping capacity remains unchanged when the additional nozzle pipe for taller vehicles is required. The cleaning effect for taller vehicles is therefore not satisfactory.

SUMMARY OF THE INVENTION

Compared with this, the basic purpose of the invention is to provide a vehicle-washing system which in a technically simple manner has a good washing result for both passenger vehicles and also taller vehicles.

This purpose is attained in the above-mentioned vehicle wash in such a manner that with each lateral spray device is associated a further spray nozzle provided on the carrier, which spray nozzle is connected to the associated lateral spray device through a flexible fluid pipeline, and that the spray angle of the further spray nozzles each cover one lateral area of the vehicle directed onto the vehicle-washing position, which lateral area follows the upper contour of the vehicle to be washed.

All spray nozzles are always operated with the inventive solution regardless of the height of the vehicle to be washed so that expensive high-pressure valves are not needed to be switched between various operating modes and the technical requirements can be kept low.

Due to the lowering ability of the further spray nozzles, they are able to be adapted at an optimum to the upper contour or height of the vehicle to be washed so that even in the case of taller vehicles a good cleaning result can always be achieved in their upper area. The spray angle of the further spray nozzles overlaps in the case of lower passenger vehicles with the spray height of the lateral spray nozzles arranged next to the vehicle-washing position. This, however, does not interfere with the cleaning behavior but rather enhances the cleaning action or a rinsing process in the sharply pulled-in area of the edge of the roof of passenger vehicles of the new design. The elevational adjustability of the further spray nozzles enables an optimum adaptation to the height of the vehicle and prevents that these nozzles spray into empty space. Moreover, all spray nozzles can thus be designed at an optimum as high-pressure nozzles.

An upper flank of the spray angle of the further spray nozzle extends advantageously up to the upper contour of the vehicle, through which occurs at an effective high-pressure prewash up to the upper contour of the vehicle including the area of the edge of the roof with an optimum use of the applied cleaning water.

An upper flank of the spray angle extends according to an advantageous development to directly below a peripheral area of the horizontally arranged washing brush or slightly into the area thereof. This arrangement enables a coupling of the contour guide of the washing brush with the further spray nozzles so that the control requirement during the high-pressure prewash is kept low and at the same time an effective rinsing of the vehicle to be washed is achieved.

All spray nozzles of one or both spray devices are, according to an advantageous development of the invention, pressurized by a common pump. With this the design requirement of the pressure-supply system can be kept small.

The further spray nozzles are advantageously arranged approximately at the height of the bottom edge of the washing brush spaced in axial direction from said brush. This makes it possible in a particularly simple manner that an area just below the washing brush, namely in the area of the upper contour of a vehicle, is reached with the further spray nozzles. The washing brush can hereby be used to stop the spread of a misty spray reflected by the vehicle. With the arrangement next to the axial ends of the washing brushes, a particularly compact design is obtained, in which the movement of the washing brush is not influenced by the position of the further spray nozzles.

Each downwardly directed high-pressure pipe is according to an advantageous development mounted to the elevationally adjustable carrier on the two sides of the washing brush, which high-pressure pipe has one of the further spray nozzles for cleaning of an area of the edge of the roof. With this an elevationally exact placement of the further spray nozzles can be accomplished in a particularly simple manner. Since the mounting occurs directly to the carrier of the washing brush, the high-pressure pipe and thus also the further spray nozzles are automatically adjusted with the elevational adjustment of the washing brush to the correct vehicle height following the upper contour.

The spray nozzles on the carrier are advantageously supplemented with at least one additional nozzle provided on said carrier, the spray angle of which is directed for cleaning of a roof of a vehicle onto an area of the roof of the vehicle in the vehicle-washing position. The at least one additional nozzle can be arranged at any desired point on the carrier, whereby attention must be paid that the spray range of same can reach the roof of the vehicle, which is in the vehicle-washing position, undisturbed by the washing brush.

The spray angle of the at least one additional nozzle is advantageously directed onto an area directly in front of the washing brush, in relationship to a relative movement between the washing brush and the vehicle to be washed. This arrangement is particularly advantageous when during a washing of a vehicle, a separate washing operation for a high-pressure rinsing in particular of the roof of the vehicle is supposed to be avoided. Two separate additional nozzles are provided in a particularly advantageous development, which additional nozzles are arranged next to the two axial ends of the washing brush on each arm cantilevered from the carrier, preferably above the axis of rotation of the washing brush. With this a particularly efficient high-pressure rinsing of the roof area of the vehicle is accomplished, with the roof area of the vehicle to be washed being initially cleaned with high-pressure water just before the washing brush and directly thereafter with the essentially horizontally extending washing brush.

The additional nozzles are advantageously also fed by the pump of the spray devices, which results in a particularly simple design of the high-pressure spray device.

The lateral spray devices for each vehicle side include, according to a further advantageous development of the invention, a vertical high-pressure pipe which has spray nozzles and is arranged next to the vehicle-washing position, whereby the flexible fluid pipeline extends from the high-pressure pipe to the associated further spray nozzle on the carrier. Thus it is possible to keep the fluid connection between the further spray nozzles arranged on the elevationally adjustable carrier and the spray nozzles stationary in their height on the high-pressure pipes next to the vehicle-washing position as short as possible so that the occurrence of compression vibrations in the high-pressure range is avoided.

According to an advantageous development of the invention, a device for sensing the upper contour of a vehicle, which is in the vehicle-washing position, is provided, which cooperates with a control device to lower the elevationally adjustable carrier to a height associated with the contour of the vehicle, at which height the further spray nozzles provided on the carrier spray the area of the upper contour of the vehicle. By coupling the elevational adjustment of the further spray nozzles with the elevational adjustment of the carrier in order to regulate the horizontally extending wash brush, an additional control requirement for the adjustment of the further spray nozzles provided on the carrier to the height of the vehicle can be avoided.

BRIEF DESCRIPTION OF THE DRAWINGS

The invention will be discussed in greater detail hereinafter in connection with exemplary embodiments illustrated in the drawings, in which.

DETAILED DESCRIPTION

Figure 1:
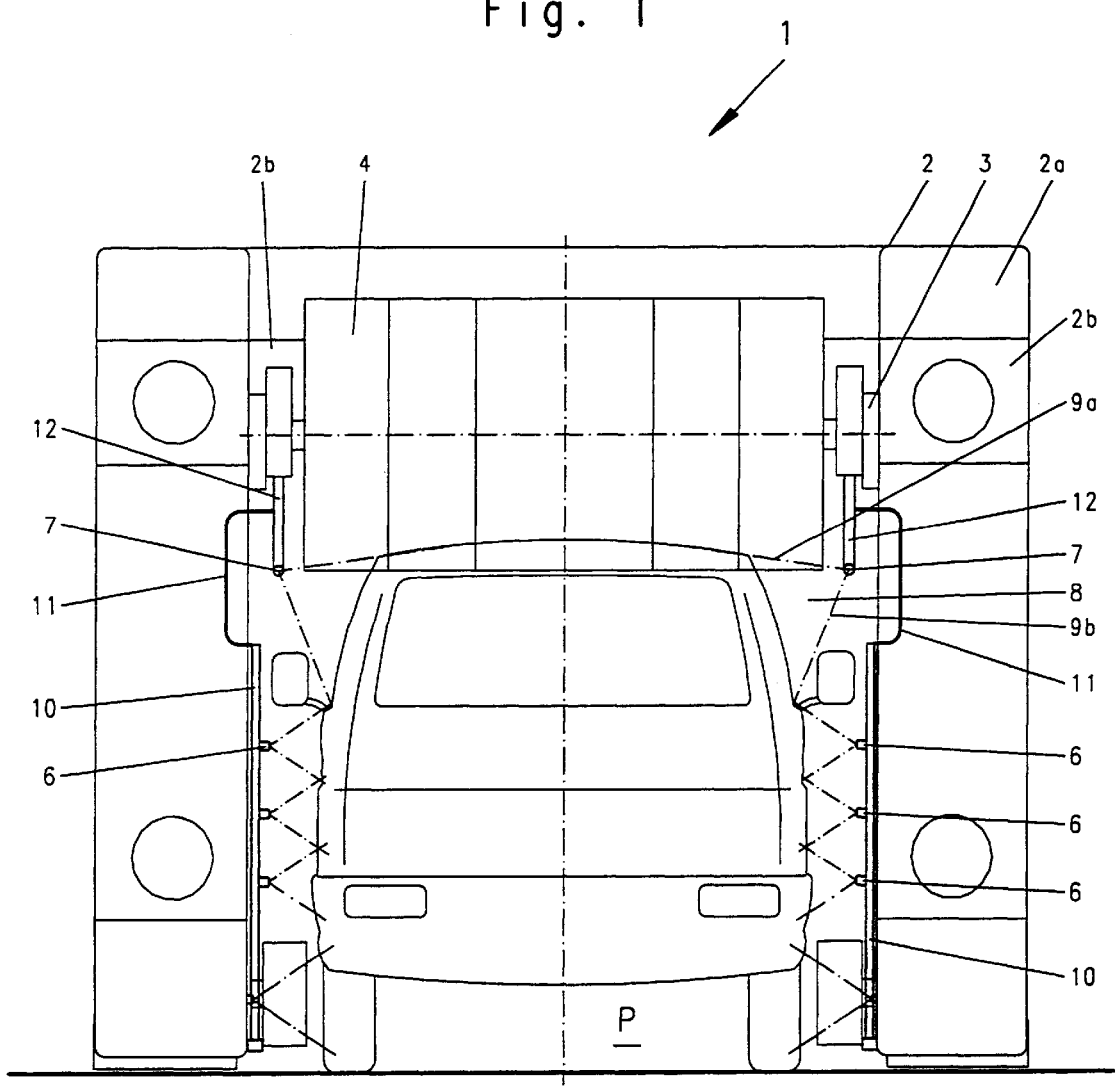
FIG. 1 illustrates a vehicle-washing system with a high vehicle in the washing position.

The exemplary embodiments each illustrate a portal washing system designed as a vehicle wash 1, in which the vehicle to be washed remains during the washing operation essentially at a fixed vehicle-washing position P. A plurality of spray nozzles 6 for applying water and/or detergent onto the vehicle to be washed and washing brushes 4, 5 are hereby arranged on a portal frame 2, which includes lateral columns 2a arranged next to the vehicle-washing position and a traverse member 2b arranged above the vehicle-washing position. The portal frame with the spray nozzles 6 and the washing brushes 4, 5 is moved along the vehicle to be washed during a washing operation. Of course it is also possible for the relative movement between the washing brushes and spray nozzles on the one hand and the vehicle to be washed on the other hand to occur by moving the vehicle, as this is, for example, the case with drive-through vehicle washes or washing lanes.

Figure 2:
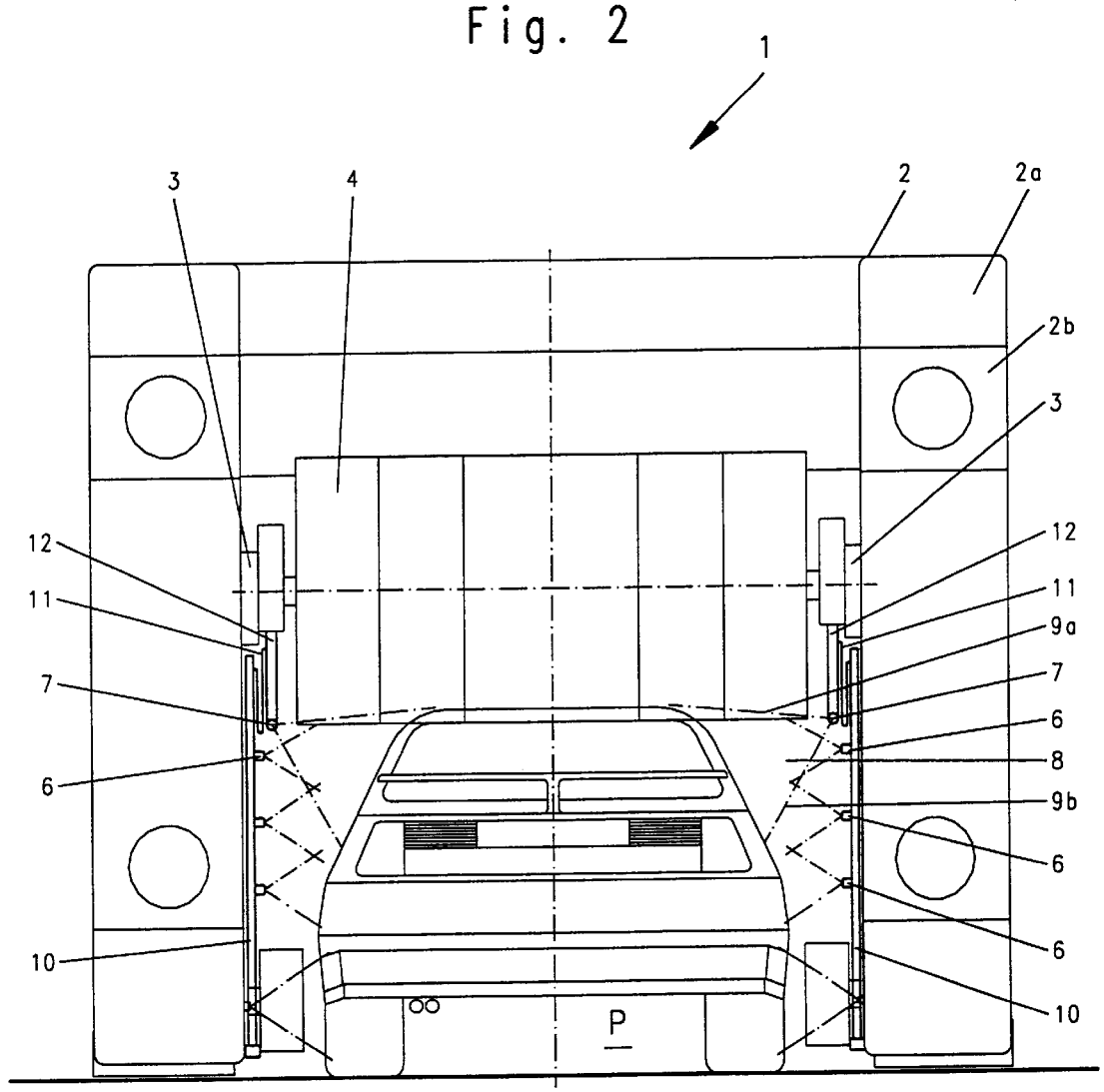
FIG. 2 illustrates the vehicle-washing system of FIG. 1 with a passenger vehicle of the usual height in the vehicle-washing position.
Figure 3:
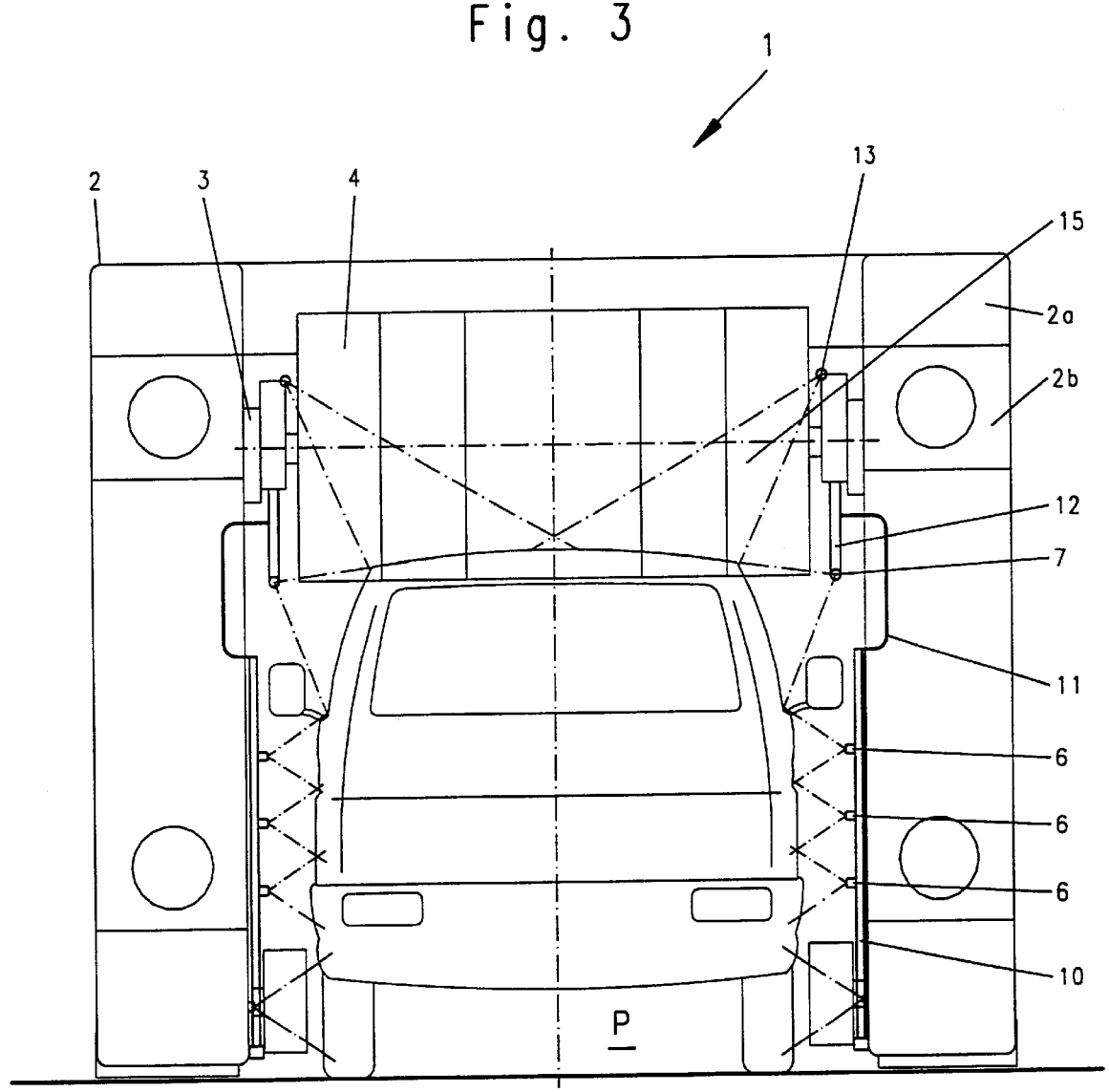
FIG. 3 illustrates an alternative embodiment of the vehicle-washing system illustrated in FIG. 1, in which two additional nozzles for a high-pressure rinse of the roof of the vehicle are provided on the carrier.
Figure 4:
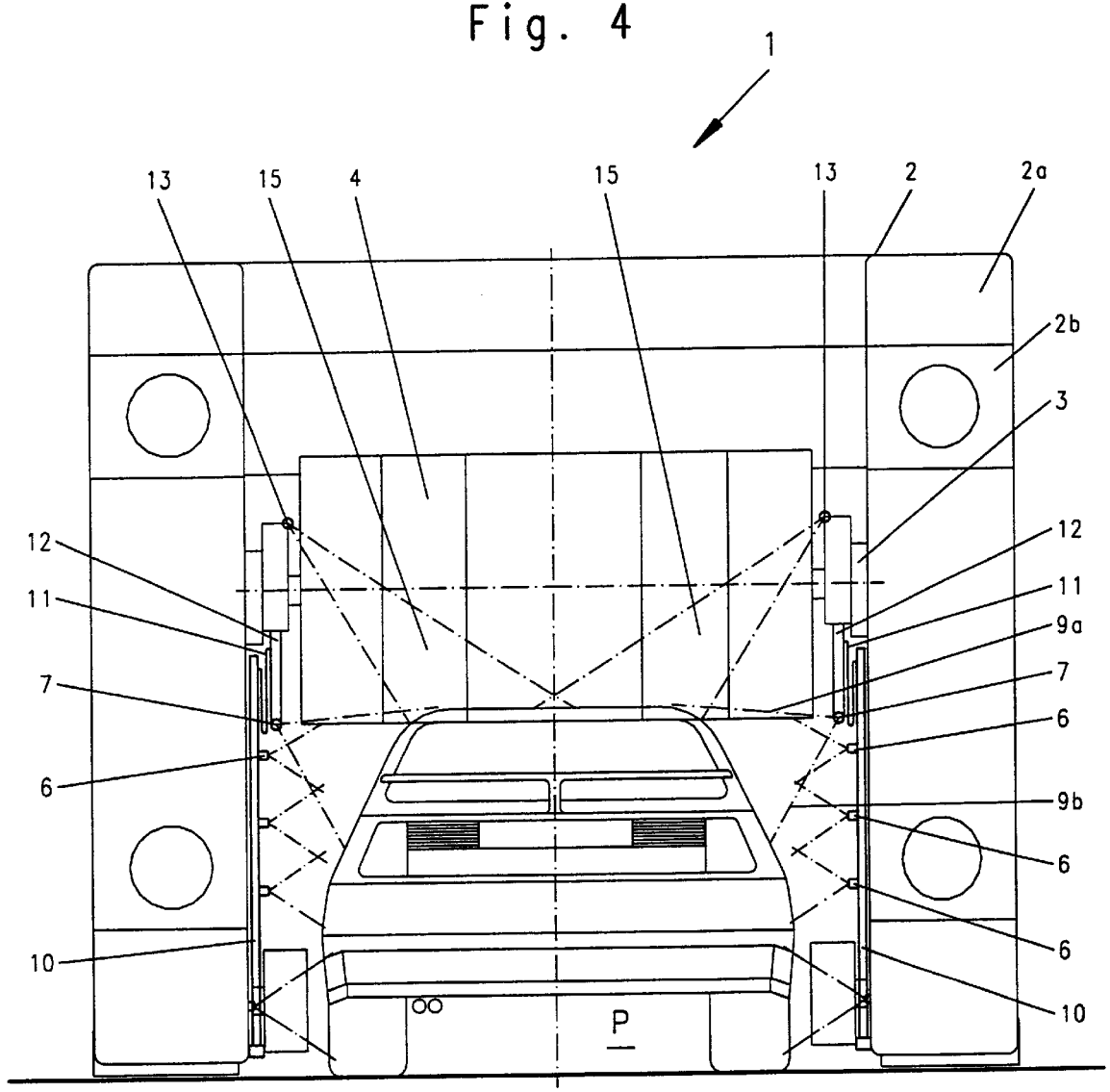
FIG. 4 illustrates the vehicle-washing system of FIG. 3 with a passenger vehicle of the usual height in the vehicle-washing position.
Figure 5:
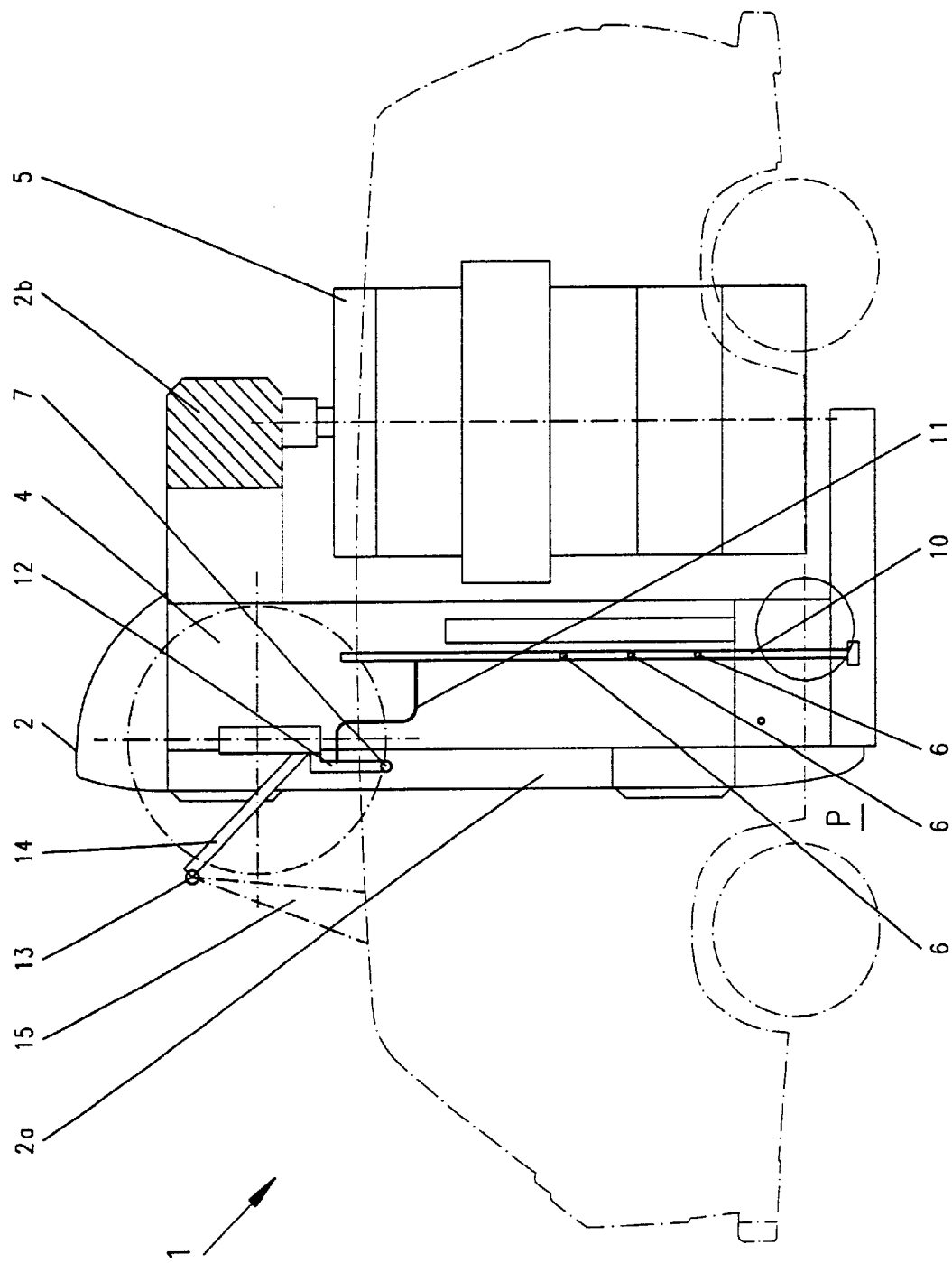
FIG. 5 is a longitudinal cross-sectional view of the vehicle-washing system illustrated in FIGS. 3 and 4.

FIGS. 1 and 2 illustrate a first exemplary embodiment. A further exemplary embodiment is illustrated in FIGS. 3, 4 and 5, whereby the same structural parts are also identified with the same reference numerals in both exemplary embodiments.

The vehicle-washing system 1 includes, as already mentioned, a portal frame 2, on which is arranged an elevationally adjustable carrier 3, which extends essentially in horizontal direction. Suitable vertical guides and corresponding driving devices are provided on the two oppositely positioned lateral supports 2a of the portal frame 2 for the up and down movement of the carrier 3, which vertical guides and driving devices enable in a controlled manner a purposeful up and down movement of the carrier 3 in dependency of the contour of the vehicle.

A washing brush 4 is rotationally drivably supported on the carrier 3. This washing brush is of a common design known to the man skilled in the art.

Two oppositely positioned washing brushes 5 essentially extending in vertical direction are furthermore provided on the portal frame 2 for washing the sides of the vehicle.

Lateral spray devices with a plurality of spray nozzles 6 and 7 directed onto the vehicle-washing position P are furthermore provided on both sides next to said vehicle-washing position P. A number of the spray nozzles 6 are thereby stationarily positioned in their height, whereas the further spray nozzles 7 are arranged adjustably with respect to the vehicle height, namely are arranged lowerably in particular to the height of the upper contour of the vehicle. The further spray nozzles 7 are mounted on the elevationally adjustable carrier 3, on which is also provided the horizontal washing brush 4. In principle it is, however, also possible to arrange the further spray nozzles 7 on a separate, elevationally adjustable carriage or carrier next to the vehicle-washing position P.

The spray nozzles 6, which are stationary in their height, are arranged such that their spray angle cover an area up to a fixed, preadjusted height, which corresponds to the height of a common passenger vehicle, as this is illustrated in FIG. 2. In the case of taller vehicles, as, for example, minivans, off-road vehicles, trucks and small busses, the active spray angles of these spray nozzles 6 do not reach to the height of the edge of the roof, as this is illustrated in FIG. 1.

The further nozzles 7 provided on the carrier 3 are used for the upper lateral vehicle sections in FIG. 1, the height of which nozzles is adjusted corresponding to the upper contour of the vehicle to be washed. The spray angle 8 of the further spray nozzles 7 is, as this is illustrated in FIG. 1, directed inclined downwardly onto the vehicle-washing position P, whereby the flank 9b lying at the bottom reaches to the active spray angle of the uppermost spray nozzle 6, whereas the upper flank 9a of the spray angle 8 extends essentially to a horizontal line in the area of the bottom edge of the horizontal washing brush 4. Deviations of some angular degrees are hereby possible, however, it is avoided that the further spray nozzles 7 spray directly into the washing brush 4. The upper flank 9a reaches thereby the upper vehicle contour.

The spray angle 8 of the further spray nozzles 7 overlaps during a lowering of said further spray nozzles 7 onto the height of the edge of the roof of a common passenger vehicle, as this is illustrated in FIG. 2, with the spray area of the spray nozzles 6 stationary in their height, whereby the spray angle 8 covers the area of the edge of the roof of the vehicle. As can be particularly well recognized in FIG. 2, the further spray nozzles 7 support the cleaning action of the spray nozzles 6 in particular in the case of vehicles with a body sharply pulled in the area of the roof.

The spray nozzles 6 and 7 are pressurized by a common high-pressure pump, which is not illustrated in the figures. Since basically all spray nozzles 6 and 7 are active at the same time, expensive and complicated high-pressure switch valves between the individual spray nozzles are not needed so that a particularly simple solution results for the high-pressure area. In principle, it is possible to supply the pressure to the nozzles through individual pipelines.

The spray nozzles 6, which are stationary in their height, are in the exemplary embodiment illustrated in FIGS. 1 and 2 each arranged on a high-pressure pipe 10 arranged laterally next to the vehicle-washing position P and extending in vertical direction. This high-pressure pipe 10 can be supported rotatably about its longitudinal axis and is mounted on the portal frame 2 in the area of the lateral supports 2a in the illustrated exemplary embodiment, whereby a separate high-pressure pipe 10 is provided for each side of the vehicle.

A downwardly directed high-pressure pipe 12 is mounted on each end of the elevationally adjustable carrier 8 spaced from the associated axial end of the washing brush 4 for the further spray nozzles 7, which high-pressure pipe 12 carries a spray nozzle 7 at its lower end.

The two high-pressure pipes 10 and 12 are connected with one another through a flexible fluid pipeline 11, whereby the connecting pipeline 11 is designed as short as possible in order to avoid compressional vibrations in the high-pressure area.

OPERATION

An operation of the vehicle-washing system illustrated in FIGS. 1 and 2 will now hereinafter be described. In order to wash a vehicle, same is first moved into the vehicle-washing position P. Subsequently the vehicle is sprayed with a prewash agent, which is thereafter washed off in a high-pressure rinsing operation, prior to a mechanical wash using preferably particularly soft washing brushes taking place.

The further spray nozzles 7 are for the high-pressure rinsing operation lowered approximately to the height of the upper contour of the vehicle to be washed and follow the contour during said rinsing operation. The further spray nozzles 7 are in the illustrated exemplary embodiments lowered together with the horizontally adjustable carrier 3 supporting the horizontal washing brush 4. The flexible fluid pipeline 11 enables thereby a stepless elevational adjustment without any problems while maintaining the fluid connection between the spray nozzles 6 and 7. The not illustrated high-pressure pump is operated after the first elevational adjustment of the further spray nozzles 7 has taken place in order to rinse the vehicle during a relative movement between said vehicle and the spray nozzles 6 and 7 and a contour-controlled elevational adjustment of the further spray nozzles 7. All general dirt is rinsed off well from the vehicle surface of both a passenger vehicle of common height and also higher vehicles during the rinsing operation. Because of the additional action of the further spray nozzles 7, a good rinsing operation of the vehicle sides results also for vehicles with a sharply pulled-in area at the edge of the roof.

A further exemplary embodiment is illustrated in FIGS. 3, 4 and 5. Same differs from the first exemplary embodiment by additional nozzles 13 for rinsing the vehicle roof and is particularly suited for such washing programs in which a separate washing operation for the high-pressure rinsing of the vehicle roof is supposed to be avoided. The spray angle 15 of the additional nozzles 13 is, as this can be recognized in FIGS. 3 and 4, directed inclined downwardly onto the area of the roof of the vehicle, whereby it is particularly favorable here to arrange the additional nozzles 13 sufficiently high above the roof of the vehicle to be washed in order to achieve a good rinsing action with a low number of nozzles. Two additional nozzles 13 are in the exemplary embodiment illustrated in FIGS. 3 and 4 provided next to the two axial ends of the washing brush 4, each of which are arranged on an arm 14 cantilevered from the carrier 3 transversely with respect to the carrier axis. The additional nozzles lie thereby above the axis of rotation of the horizontal washing brush 4 and are, as this can be recognized in FIG. 3, arranged outside of the radius of rotation of the washing brush 4. The spray angle 15 of the additional nozzles 13 is directed to an area directly in front of the washing brush 4, referred to a relative movement between the washing brush 4 and the vehicle to be washed, in order to permit a high-pressure rinsing of the roof of the vehicle undisturbed by the washing brush 4.

The installation of a complete high-pressure nozzle pipe for the additional nozzles 13 in front of the horizontal washing brush 4 would be technically possible, however, it would then be necessary to tilt in a complicated manner this high-pressure pipe upwardly during washing of high vehicles with a steep front in order to avoid damaging it. The upward tilt would automatically change the position of additional nozzles mounted thereon and an atomization of the surroundings of the vehicle-washing system with water would result. Moreover, this would extend the length of the vehicle wash and thus of a, if necessary, needed hall. An arrangement of such a high-pressure pipe above the washing brush would moreover, because of the large distance from the roof of the vehicle to be rinsed, be connected with a great demand for pressure.

Whereas the arrangement of the additional nozzles 13 at the ends of inclined forwardly directed arms 14 offers a device for the efficient high-pressure rinsing of a roof of a vehicle, which device operates with relatively low demand for pressure and is still spacially compact.

The further spray nozzles 7 and also the additional nozzles 13 can in a modification of the above-described exemplary embodiments be arranged on a separate elevationally adjustable carrier, which is separate from the carrier 3 supporting the horizontal washing brush 4, which carrier, however, does not necessarily need to extend transversely over the vehicle-washing position P. For the elevational adjustment of such a carrier, it is possible to use the same device for the contour control, which is also used for the adjustment of the height of the carrier 3 and thus of the horizontal washing brush 4. It is hereby possible, even with a separate arrangement of the further spray nozzles 7 from the carrier 3, to keep the number of sensing devices and control devices low. The further spray nozzles 7 can, if necessary, also be mounted on an elevationally movable and contour-controlled drying nozzle extending transversely over the vehicle-washing position P.

It is possible to achieve with the described exemplary embodiments with few structural requirements a very high cleaning performance in a high-pressure rinsing operation of a vehicle-washing system, which thereafter enables the use of particularly soft washing brushes for the mechanical cleaning task.

What is claimed is:

1. A vehicle washing system for washing of vehicles, comprising high-pressure lateral spray devices which are arranged on both sides next to a vehicle-washing position, and which have spray nozzles for cleaning of the sides of a vehicle, whereby the spray nozzles cover with their spray angles an area of up to a height which corresponds to the height of a passenger vehicle, and comprising a carrier elevationally adjustable in dependency of the contour of the vehicle, on which carrier is arranged a washing brush for cleaning the roof of a vehicle, wherein with each lateral spray device is associated a further spray nozzle provided on the elevationally adjustable carrier, which spray nozzle is connected to the associated lateral spray device through a flexible fluid pipeline, and wherein the spray angle of each further spray nozzle covers a lateral area of the vehicle directed onto the vehicle-washing position, which lateral area follows the upper contour of the vehicle to be washed.

2. The vehicle-washing system according to claim 1, wherein the spray angle of each further spray nozzle is directed inclined downwardly onto the vehicle-washing position.

3. The vehicle-washing system according to claim 1, wherein an upper flank of the spray angle of each further spray nozzle extends to the upper contour of the vehicle.

4. The vehicle-washing system according to claim 1, wherein the washing brush is horizontally arranged and an upper flank of the spray angle of each further spray nozzle extends to directly below a peripheral area of the horizontally arranged washing brush or slightly into same.

5. The vehicle-washing system according to claim 1, wherein an upper flank of the spray angle of each further spray nozzle is essentially horizontally arranged.

6. The vehicle-washing system according to claim 1, wherein all spray nozzles of at least one lateral spray device are pressurized by a common pump.

7. The vehicle-washing system according to claim 1, wherein the further spray nozzles are arranged approximately at the height of the bottom edge of the washing brush spaced in axial direction from said brush.

8. The vehicle-washing system according to claim 1, wherein a downwardly directed high-pressure pipe is mounted on the elevationally adjustable carrier on each side of the washing brush, which high-pressure pipe has one of the further spray nozzles for cleaning of the area of the edge of the roof.

9. The vehicle-washing system according to claim 1, wherein the spray nozzles on the carrier are supplemented with at least one additional nozzle provided on said carrier, the spray angle of which additional nozzle is directed for cleaning of a roof of a vehicle onto an area of the roof of the vehicle in the vehicle-washing position.

10. The vehicle-washing system according to claim 9, wherein the spray angle of the at least one additional nozzle is directed onto an area directly in front of the washing brush, in relationship to a relative movement between the washing brush and the vehicle to be washed.

11. The vehicle-washing system according to claim 9, wherein two further additional nozzles are provided, wherein each further additional nozzle is arranged next to an axial end of the washing brush and is spaced from said washing brush on an arm cantilevered from the carrier above the axis of rotation of the washing brush.

12. The vehicle-washing system according to claim 11, wherein the additional nozzles are fed by a pump of the spray devices.

13. The vehicle-washing system according to claim 1, wherein the lateral spray devices for each side of the vehicle include a vertical high-pressure pipe provided with spray nozzles, which high-pressure pipe is arranged next to the vehicle-washing position, and that the flexible fluid pipeline extends from this high-pressure pipe to the associated further spray nozzle on the carrier.

14. The vehicle-washing system according to claim 1, wherein said vehicle-washing system has a device for sensing the upper contour of a vehicle, which is in the vehicle-washing position, which device cooperates with a control device to lower the elevationally adjustable carrier to a height associated with the contour of the vehicle, at which height the further spray nozzles provided on the carrier spray the lateral area along the upper contour of the vehicle.

* * * * *